March 29, 1955 C. KLINGENS 2,704,859
MEAT TENDERING MACHINE
Filed April 23, 1949 5 Sheets-Sheet 3

Inventor
Cornelis Klingens
By: Spencer, Marzall, Johnston & Cook
Attys

March 29, 1955  C. KLINGENS  2,704,859
MEAT TENDERING MACHINE
Filed April 23, 1949  5 Sheets-Sheet 4
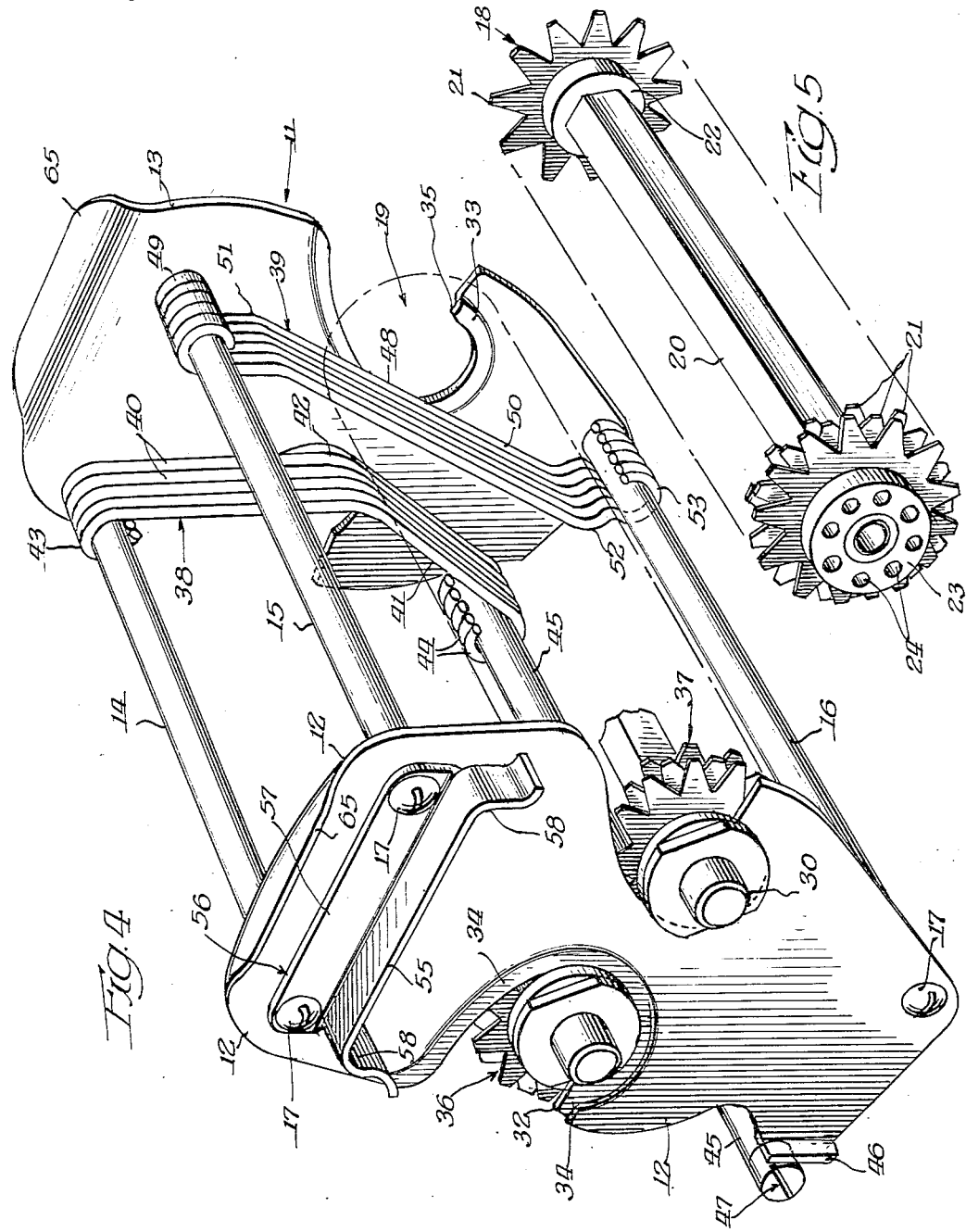
Inventor
Cornelis Klingens
By: Spencer Marzall Johnston & Cook
Attys

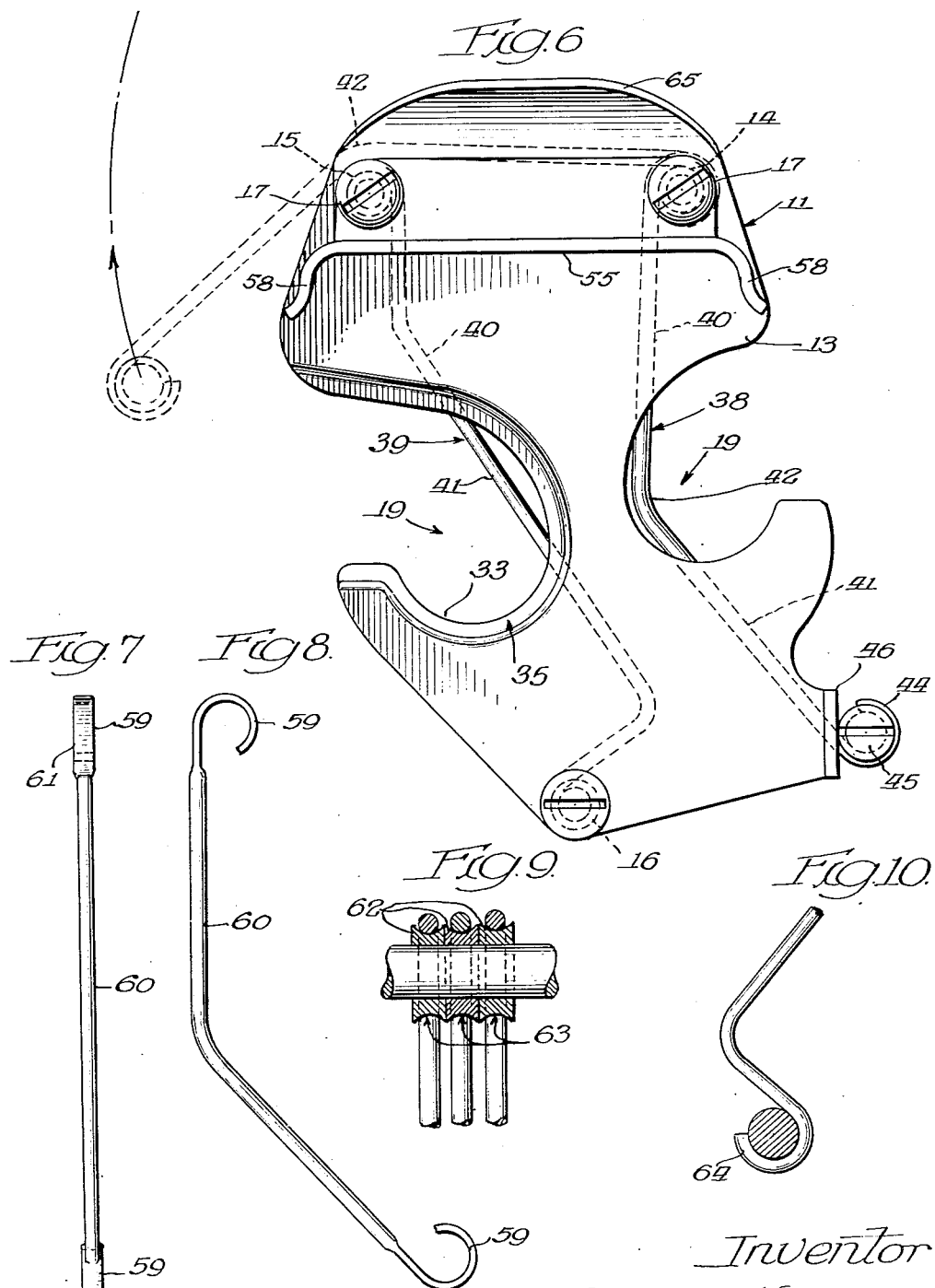

United States Patent Office 2,704,859
Patented Mar. 29, 1955

2,704,859

MEAT TENDERING MACHINE

Cornelis Klingens, La Porte, Ind., assignor to U. S. Slicing Machine Company, Inc., La Porte, Ind., a corporation of Indiana Application April 23, 1949, Serial No. 89,240

2 Claims. (Cl. 17—26)

This invention relates to a meat tendering machine in general and particularly to the securement or arrangement to a meat tendering machine of meat tendering knife rolls and strippers for said knife rolls.

The primary object of the present invention consists in the provision of a frame which is detachably or demountably arranged and supported in a tendering machine, the frame carrying demountable knife rolls and hingedly supported strippers engaging the space between the knives of the knife rolls.

Another important object of the invention resides in the provision of new and novel stripper members which have limited axial movement about supporting rods and which are adapted to have a predetermined amount of swingable movement about a rod which acts as a support for some of the stripper members.

Another object of the invention resides in the provision of a new and novel construction and arrangement whereby the frame is adapted to be detachably connected to the machine, the frame rotatably and removably supporting a plurality of spaced knife rolls having spaced apart knives, the knives of one roll engaging the spaces between the knives of the other roll, the knife rolls being adapted to be driven by rotating parts carried by a rigid part of the machine, there being new and improved strippers comprising a plurality of fingers mounted on a longitudinal rod, the stripper members being mounted and supported on rods connecting opposite sides of the frame.

A further object of the invention consists of a frame demountably supported by a tendering machine, the frame comprising a plurality of spaced rods upon which there are mounted for limited axial movement thereon a plurality of stripper members, at least one of said rods being loose whereby the stripper members acting as a stripper for one knife roll may be shifted bodily about a horizontal axis to thereby present the various surfaces of the strippers so as to effect easy cleaning thereof.

A still further object of the invention resides in the arrangement and position of a plurality of contiguous stripper members which are preferably circular in cross section throughout the larger part of the length thereof but which are flattened at their attaching ends to rods so as to provide spaces between the members for the reception of knives on a knife roll, the said members being adapted to have limited axial slidable movement so as to permit the members to be arranged between adjacent knives and thereby assist in preventing damage to the knives from striking the stripper members because of the axial displacement thereof.

Still another object of the invention resides in the provision of a plurality of strippers arranged in spaced relationship, each stripper comprising a plurality of spaced stripper members secured at their ends to a spaced upper and lower rod, at least one rod of one stripper being free from attachment to the supporting frame whereby one stripper may be movable about one rod acting as a pivot therefor.

Numerous other objects and advantages will be apparent throughout the specification which follows.

The accompany drawings illustrate a certain selected embodiment of the invention, and the views therein are as follows:

Fig. 4 is a detail perspective view of the removable frame which is adapted to be demountably attached to the machine frame and carrying the strippers and the knife rolls;

Fig. 5 is a detail perspective view of a knife roll;

Fig. 6 is a detail end elevational view of the frame to which the strippers are mounted, the knife rolls being removed;

Fig. 7 is a detail elevational view of a modified form of stripper member which may be used for the strippers;

Fig. 8 is a side elevational view of the stripper member shown in Fig. 7;

Fig. 9 is a detail sectional view showing another manner in which the stripper members may be mounted on their supporting rods; and Fig. 10 is an end view showing a modified manner in which the lower ends of the stripper members may be secured to the rods.

Figure 1:
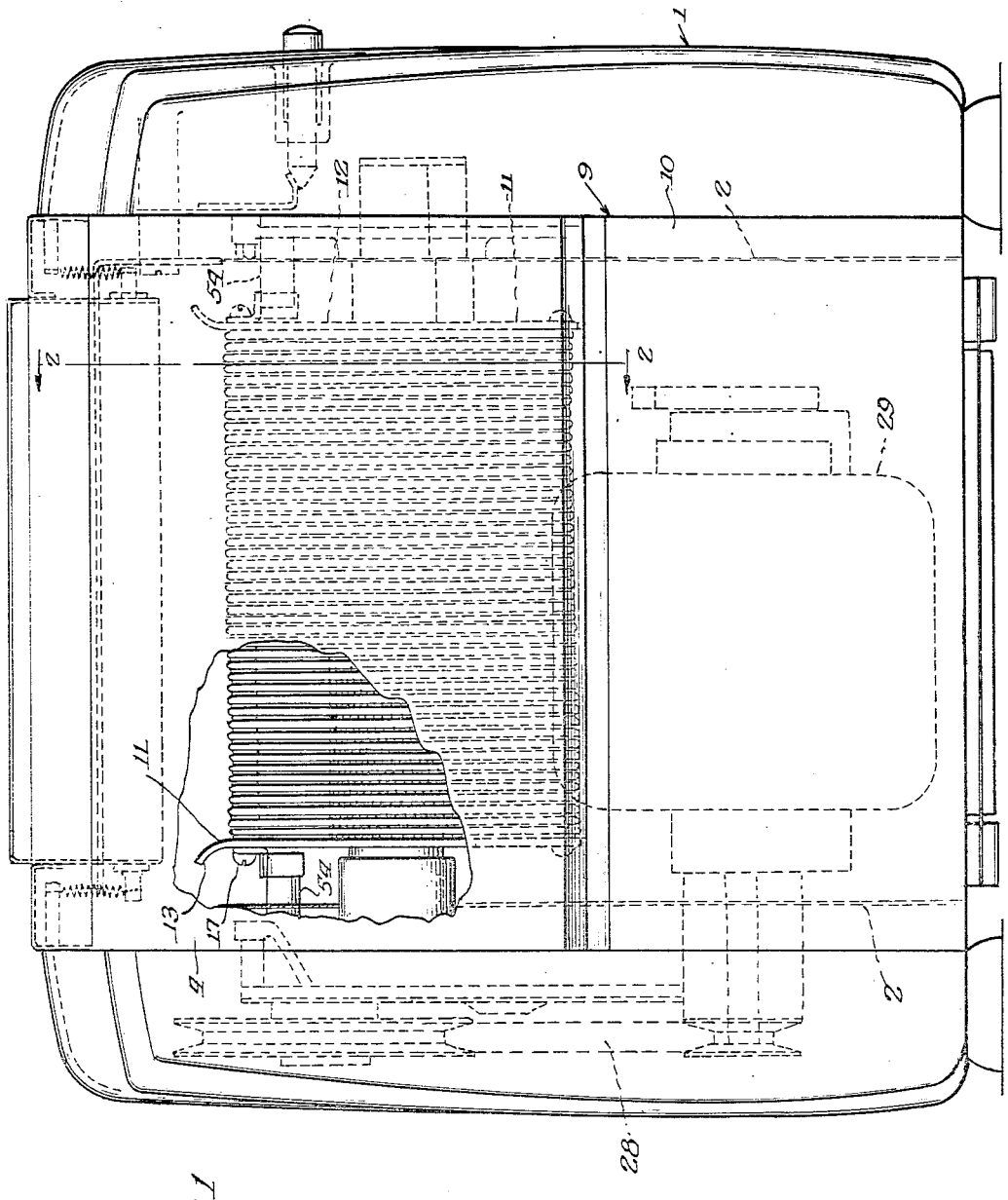
Fig. 1 is a detail front elevational view of one form of tendering machine and embodying the invention, certain parts being broken away for the sake of clearness.

The particular construction herein shown for the purpose of illustrating the invention comprises a meat tendering machine having a housing 1 which covers or houses a main frame embodying inwardly spaced side plates or walls 2, 2, Fig. 1. The meat tendering machine is provided with a neck 3 at its upper end, through which foodstuffs such as meat are adapted to be inserted for the purpose of being tenderized, Fig. 2. The front 4 of the machine is adapted to be hingedly connected by means of hinges 5 mounted on pivots 6 so that the front 4 may be pivotally mounted with respect to the main part 7 of the housing, Fig. 2. An inclined plate 8 is adapted to deliver foodstuffs, such as meat, which have been previously tendered, to the front of the machine, the foodstuffs being removed in tenderized condition from the front end of the plate 8 at an opening 9 at the front of the machine. The opening 9, Fig. 1, is adapted to be closed by a door 10 which is hingedly mounted at its bottom to a fixed part of the machine and therefore swings outwardly and downwardly so as to permit proper access to the opening 9 to remove foodstuffs therefrom. The door 10 in its open position may project outwardly and forwardly at a plane substantially flush with the forward end of the inclined plate 8 so as to provide a shelf upon which the foodstuffs in tenderized form may be carried or to receive a tray upon which the foodstuffs may be placed.

A frame member 11 is adapted to be removably mounted in the upper part of the machine between the spaced side walls 2 and above the inclined plate 8.

The frame member which is more clearly shown in Figs. 4 and 6, comprises a pair of end plates or brackets 12 and 13 which are spaced apart a predetermined distance by means of upper tie rods or spacer bars 14 and 15 and a lower tie rod 16. These tie rods or spacer bars 14–16 are adapted to be locked in rigid position when the frame member is assembled but may be removed by means of screws 17 passing through the end plates 12 and 13 and threadedly engaging the ends of the rods, Figs. 1, 3, 4 and 6.

Figure 2:
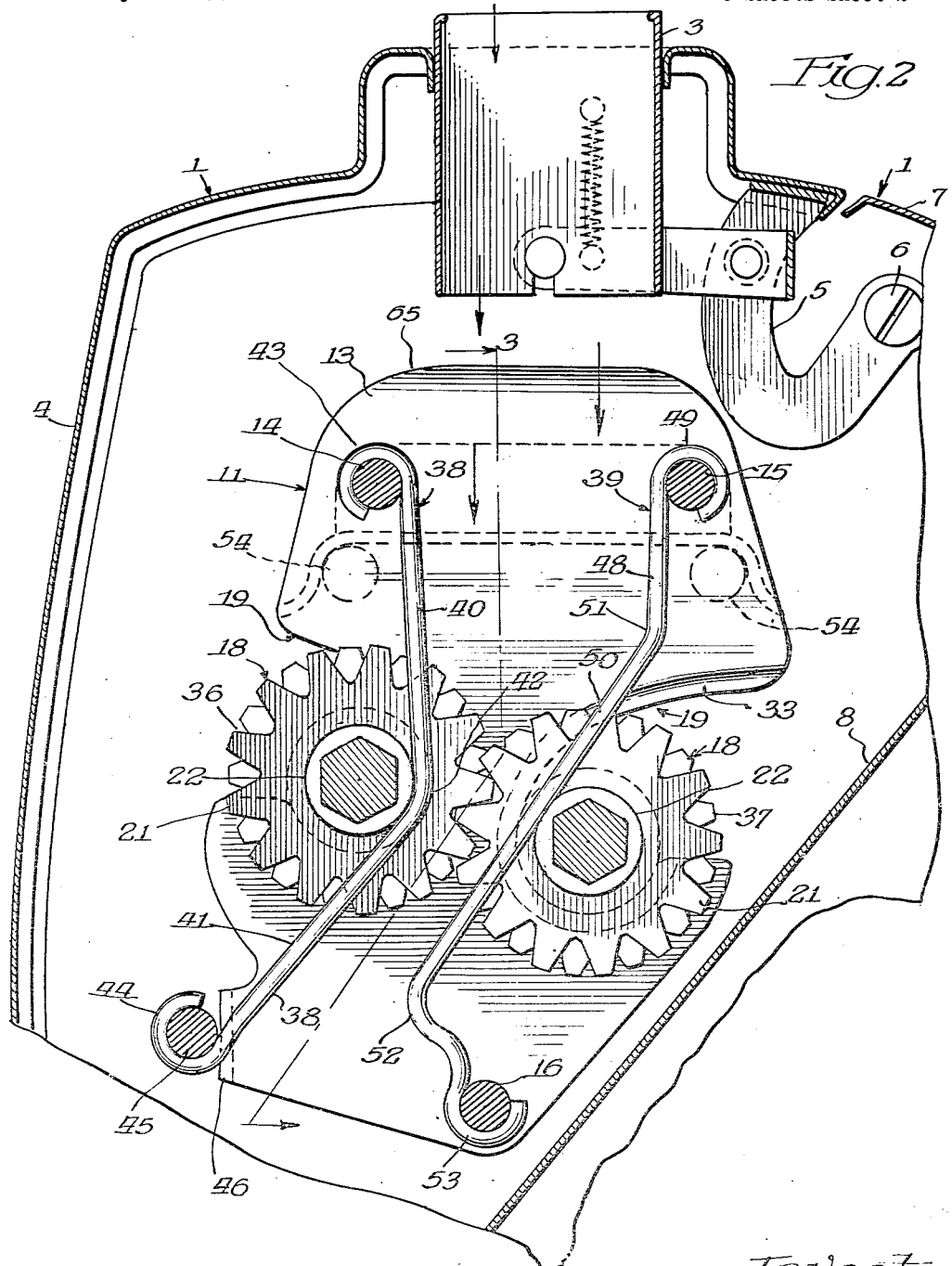
Fig. 2 is an enlarged detail vertical elevational view on the line 2—2 of Fig. 1.

The end plates or brackets 12 and 13 are adapted to support therebetween a pair of spaced knife rolls 18, 18, Figs. 2, 4 and 5, and, to accommodate the knife rolls 18, the end plates or brackets 12 and 13 are each provided with openings 19, 19 of curved formation at their side edges and in axial alignment to receive the knife rolls 18, Figs. 2, 4 and 6.

Each knife roll 18 comprises an elongated shaft 20 which may have any desirable cross sectional configuration but is shown herein specifically as being hexagonal. Knives 21 are provided with a central opening of the same cross sectional configuration as the shaft 20 and are arranged along the shaft in spaced formation. Spacer members 22 are arranged between adjacent knives so as to maintain the knives in proper spaced relationship along the shaft 20. One end of the knife roll is provided with a collar 23 which is rigidly secured thereto, there being a plurality of spaced openings or sockets 24, Fig. 5, arranged in circular formation about the outer surface of the collar 24 so as to engage a driving pin 25, Fig. 3, carried by a driving collar 26. The driving collar 26 is rigid with a driving shaft 27 which is driven in any suitable manner, such as by belts 28, from an electric motor 29, Fig. 1. The opposite end of each knife roll 18 is provided with a reduced end 30 which is received in a bearing 31 supported by a side wall 2, to the left, Fig. 3. The bearing 31 is such that it may be shifted axially and longitudinally with respect to the knife roll shaft 20 so that the end of the knife roll shaft may be easily lifted out of position. The driving end 23 of the knife roll is adapted to be disconnected from the driving pin by merely shifting the knife roll shaft longitudinally so as to clear the driving pin 25. The knife roll 18 therefore has a driving connection at one end thereof and has its other end rotatably supported in a shiftable bearing 31.

Two knife rolls 18 are required for tenderizing foodstuffs, such as meat, therebetween. These knife rolls are identical in shape, size and construction but one knife roll is adapted to be positioned with respect to its adjacent knife roll so that the knives on one roll will be positioned between the knives on the adjacent cooperating knife roll. To effect proper positioning of the knife rolls so that the knives on one roll will fit into the spaces between knives of the other knife roll, the end plates or bracket members 12 and 13 may be provided with projections 32 and 33 on the brackets 12 and 13, respectively. The projections 32 and 33 project inwardly and may be formed by pressing in or embossing the plates 12 and 13 as indicated at 34 and 35, respectively. The projection 32 is on the right hand side of the machine, while the projection 33 is on the left hand side, Figs. 2, 3, 4 and 6. One knife roll 18 is arranged on the front side of the machine, as indicated at 36, and its lateral position is determined by the projection 32 on the end plate 12. The other knife roll 18 is positioned at the rear side of the machine, as indicated at 37, and cooperates with the projection 33 extending inwardly from the bracket 13, as clearly shown in Figs. 2, 4 and 6. This latter projection fixes the lateral position of the rear knife roll 37. The rear knife roll 37 is adapted to be arranged in position first while the front knife roll 36 is adapted to be positioned lastly. Therefore, when the knife roll 36 is positioned in place the knives 21 of each knife roll will fit within the space between the knives of the adjacent knife roll. These knife rolls 18 arranged in the positions 36 and 37, Fig. 2, are adapted to cooperate with a front stripper 38 and a rear stripper 39, Figs. 2, 3, 4 and 6.

The front stripper 38, Figs. 2, 4 and 6, which is adapted to cooperate with the knife roll 18 at the front of the machine as indicated at 36, comprises a plurality of elongated stripper members or rods 40 arranged longitudinally along the upper spacer rod 14 and extend downwardly therefrom. The stripper members 40 incline slightly inwardly a predetermined distance substantially midway of the length and then extend outwardly as indicated at 41, Fig. 6, there being a bend 42 where the outer ends of the stripper members incline outwardly and downwardly as indicated at 41. The upper ends of the individual members 40 are curved as indicated at 43, and encircle the tie rod or bar 14. The outer ends of the individual stripper members 40 are curved as indicated at 44, Figs. 4 and 6, and encircle a loose or unconnected rod 45. The loose or unconnected rod 45 extends a predetermined distance beyond the outer surface of the end plates 12 and 13, and is adapted to abut against ears 46 in the form of lateral flanges bent over from part of the end plates 12 and 13. The individual stripper members 40 are adapted to be arranged between the knives 21 of the front knife roll, and when arranged in such position will be in the position shown in Fig. 2. The positioning of the knife roll 18 at the front of the machine, as indicated at position 36, Fig. 2, will cause the front stripper 38 to be positioned properly with the ends of the unconnected rod 45 engaging the flange or ears 46. The upper curled ends 43 of the stripper members 40 of the front stripper 38 are slipped over the tie rod 14, whereupon that tie rod is arranged in position between the end plates and then locked in position by the screws 17. The lower curved ends 44 of the stripper members 40 are mounted on the lower unconnected rod 45, the ends of which rod are somewhat enlarged. However, either one or both enlarged ends may be threadedly connected to the body proper of the rod 45 so that the rod 45 may be slipped freely through the curved ends 44. After the stripper members are arranged in position on the rod 45, the enlarged end may be screwed in place, there being a slot 47, Fig. 4, in the end of the enlargement to permit the enlargement to be screwed or unscrewed in place. The front stripper 38 is adapted to cooperate with the rear stripper 39 so as to form a guide for the foodstuffs passing between the knife rolls during the tendering process of the material passing through the opposed knife rolls. These strippers also prevent foodstuffs or parts thereof, such as sinews and the like, from winding around the knife rolls. The strippers 38 and 39, therefore, strip the meat from the rolls and prevent the meat, or parts thereof, from winding around the knife shafts.

The rear stripper 39 comprises a plurality of stripper members 48 which are provided with curled ends 49, which fit about the upper tie rod 15. These stripper members 48 extend downwardly in a relatively straight vertical plane and then incline inwardly to provide the inclined part 50, the members 48 being bent at 51 at the upper point of inward inclination, Figs. 1, 4 and 6. The lower ends of the stripper members 48 are bent in a rounded curve, as indicated at 52, and then extend inwardly a predetermined distance where they terminate in curved ends 53 and encircle the bottom tie rod 16. The stripper members 48 of the rear stripper member 39 are adapted to extend between the knives 21 of the rear knife roll in the manner clearly shown in Fig. 2.

The stripper members 40 of the front stripper 38 and the stripper members 48 of the rear stripper 39 are loosely mounted on their respective rods 14, 45 and 15, 16, so that these stripper members may move or shift laterally and longitudinally along their rods. Furthermore, this arrangement permits the knife rolls to be arranged easily in place, as each individual stripper member is adapted to shift slightly to permit free and easy installation of the knife rolls to properly position the stripper members between the blades of the respective knife rolls. Also, in cases where an extremely hard or tough part of a piece of meat being tenderized comes in contact with the knives, and the knives are subjected to extreme punishment and are likely to flex, the stripper members adjacent such knife or knives will be free to shift laterally and thereby prevent the knife from cutting into the stripper members and damaging the knife or the stripper member. Each stripper member, therefore, is free to float longitudinally along the supporting rods or shafts a predetermined distance to provide a certain amount of flexibility to permit shifting of the stripper members a predetermined limited distance. In actual practice it has been found that by loosely mounting the stripper members by the provision of spacing the stripper members a predetermined distance apart and rendering the stripper members relatively free-floating on their supporting rods or shafts, there is little, if any, likelihood of the knives striking the stripper members, and therefore the knives and the stripper members will wear longer and the knives will remain sharp for a longer period of time.

A very important feature in connection with food handling machines is that they must be so made and constructed as to permit easy cleaning. The arrangement of the present invention, therefore, is such that the knife rolls may be easily removed for cleaning purposes. Also, the strippers may be easily cleaned. Furthermore, it is desirable that the knife rolls, which comprise a plurality of knives having relatively sharp edges, be arranged so that it will not be difficult to remove the knife rolls and so that the removal of the knife rolls will not be dangerous to the operator. The knife rolls and the strippers, therefore, constitute a single unitary element which may be applied and removed from the machine at will. The unit comprises the end frames 12 and 13, the tie rods 14, 15 and 16, and the loose rod 45, the strippers 38 and 39, and the knife rolls 18. All these items are arranged in a compact form and comprise a frame member supporting front and rear strippers, end plates and knife rolls. The entire unit comprising these elements may be removed or applied as a single unit from and to the machine as required. The removal of this unit which comprises these elements is very simple, and the operator's hands do not come in contact with the sharp edges of the blades. After the unit has been removed from the machine the knife rolls may be grasped by the ends and removed from the unit by moving them outwardly out of the slots 18. The removal of the knife rolls leaves only the unit comprising the end plates, the rods and the stripper members as shown in an elevation in Fig. 6. The front stripper 38, after the front knife roll has been removed, is free to pivot about the upper tie rod 14 in various angular positions of a vertical arc. The pivotal moving or shifting of the front stripper permits access to the rear stripper as well as to the front stripper whereby the strippers may be put under a hot water faucet for proper cleaning. The bend 42 of the front stripper members occurs so that when the front stripper is moved from the full line position to the dotted line position shown in Fig. 6 it will be at the rear upper tie rod 15.

The entire unit which is supported by the longitudinal tie rods 14–16 connected to the end plates is supported in the machine by means of fillister-head screws 54 which project inwardly from the side walls 2 of the main frame. These fillister-head screws 54 are adapted to be engaged by a supporting leg or arm 55 forming a shelf. The shelf or leg 55 comprises the lower member of an angle member 56 which is secured to outer ends of the end plates 12 and 13. The angle members 56 have their upper legs 57 secured to the outer surfaces of the end plates 12 and 13 by the same screws 17 which hold the tie rods 14 and 15 in position. The supporting legs 55 are curved near their outer ends, as indicated at 58, so as to conform with the circular formation of the fillister-head screws 54, Fig. 2. Therefore, when the unit is mounted in operable position in the machine, longitudinal movement of the unit is prevented by the end bearings at the left and by the shiftable bearings 31. Front to rear movement is prevented by the engagement of the fillister-heads 54 with the curved parts 58 of the supporting legs 55, and by the knife rolls in the slots 19 of the end plates 12 and 13. There will be no vertical movement of the device because the knife rolls are locked in position by the engagement of the driving pins 25 and by the end bearings 31. The unit is applied easily and located in position, therefore, by merely dropping the device vertically in position so that the two-fillister-head screws on the side walls will be within the confines of the curved ends 58 of the supporting legs 55.

Figure 3:
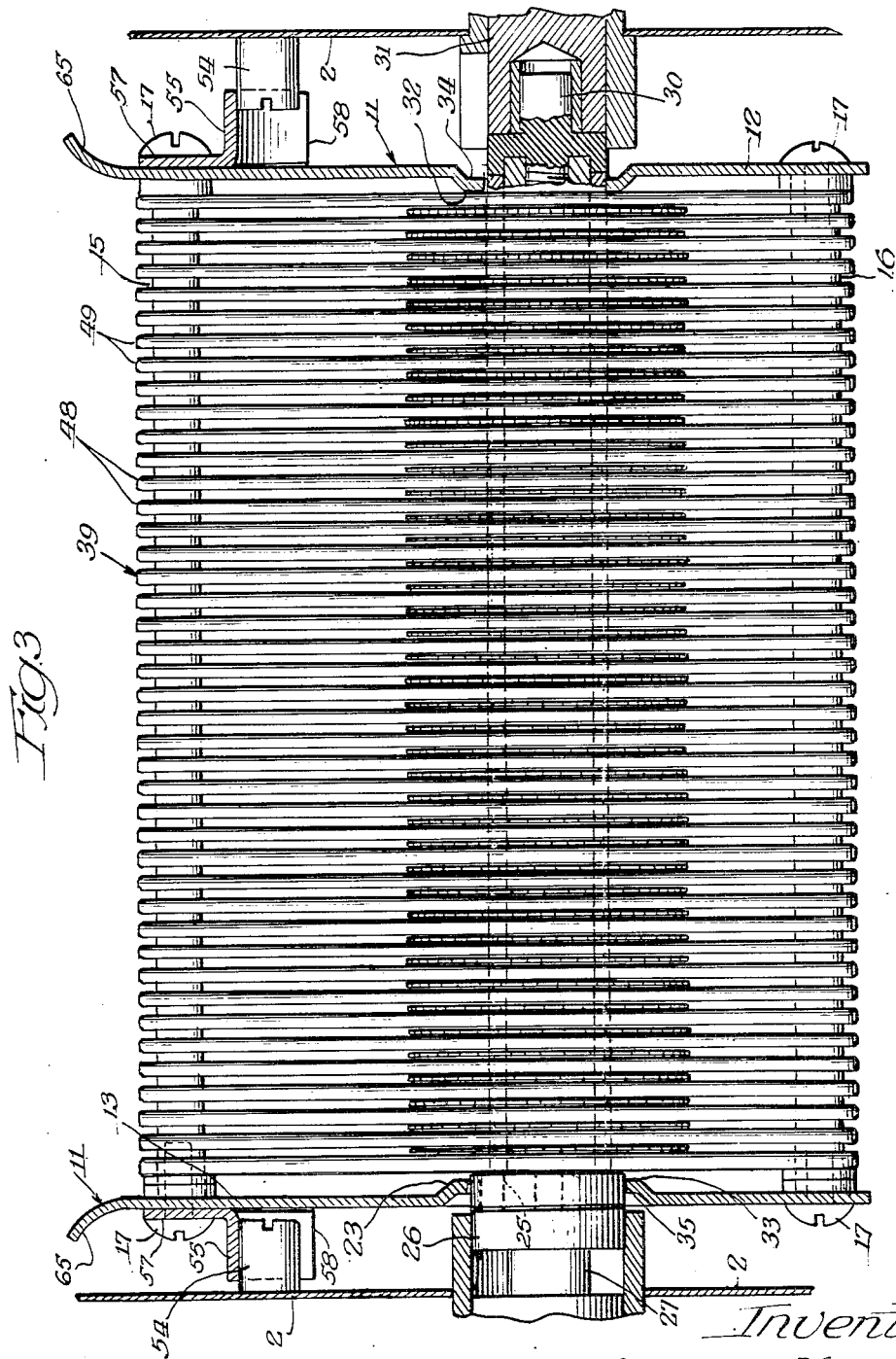
Fig. 3 is a detail vertical sectional view on the line 3—3 of Fig. 2.

The stripper members 40 or 48 may be circular in cross-section and spaced a predetermined distance apart as shown more clearly in Fig. 3. The upper and lower ends of each stripper member are adapted to be bent outwardly in the manner shown in Fig. 2, so that the extreme free ends of these members will not engage the meat either at the delivery end or at the discharge end thereof. However, instead of making the stripper members 40 and 48 the same diameter throughout the entire length, it has been found desirable to flatten the ends of the stripper members, as indicated at 59, Figs. 7 and 8. The stripper members shown in Figs. 7 and 8 are circular or relatively circular in cross section throughout the entire body part 60 thereof, and are of the same configuration as the stripper members 40 and 48, the only difference being in the formation of the ends which are flattened, as indicated at 59, at both the upper and lower ends. The flattening of the upper and lower ends of the stripper members enlarges the ends as indicated at 61, Figs. 7 and 8, so that when the stripper members are arranged on their respective shafts or rods there will be a proper space between the adjacent stripper members. However, if desired, the stripper members 40 or 48 may be arranged in spacer members 62, as clearly shown in Fig. 9. These spacer members 62 are provided with peripheral grooves 63 completely about the periphery thereof, so as to receive the ends of the stripper members. It is desirable that each of the grooves 63 be cut on a radius slightly larger than the radius of each of the stripper members so that the stripper members shown in Fig. 9 may have limited shiftable movement, as well as allowing the stripper members to have a slight shiftable movement with respect to the spacer members 62.

Instead of curving the ends of the stripper members outwardly, as indicated in Fig. 2, the ends of the stripper members may be curved inwardly, as indicated at 64, Fig. 10. However, this is a mere matter of convenience in manufacture, but in actual practice it has been found desirable to bend the ends of the stripper members outwardly, as shown in Fig. 2. It has been found in actual practice that the flattening of the upper ends of the stripper members, as shown in Figs. 7 and 8, is the most desirable and preferred construction. The flattening of the upper and lower ends provides proper spacing of the stripper members between their ends so as to accommodate the knives and properly space the stripper members with respect to the spaces between knives into which they fit. The flattened ends 59 of the stripper members are loosely mounted on the rods and have slight or limited movement along the knives, and the spaces between the stripper members are determined by the broadening out of the upper ends by the flattening thereof.

The stripper members of each stripper are loosely mounted on their respective supports or bars when the strippers are in operative position. Each stripper member has both forward and rearward movement on the supports upon which they are mounted. Each stripper member also has side-to-side movement, that is slidable movement axially on their supporting bars. The amount of forward and rearward movement may be increased or decreased according to the conditions prevailing and according to the size of knives, knife roll location and other determining factors. The amount of side-to-side longitudinal or axial movement may be increased or decreased according to the positioning or spacing of knives, knife thickness and other factors. The size thickness of the stripper members may also be a factor in determining the axial side shifting of the stripper members.

The size, positioning and arrangement of the stripper members makes the stripper members of each stripper self-alining and self-adjustable. The stripper members are arranged in the spaces between knives and shift longitudinally to accommodate for differences in knife spacing and knife thickness. They also provide for shiftable movement according to the thickness of the material being tenderized. The stripper members therefore "give" or shift according to the conditions present. They are free to move sideways, and forwardly and rearwardly, but return to normal position. The stripper members therefore adjust themselves to the conditions present or occurring and they always are in proper alinement and in adjusted position. The members having side-to-side movement and front to rear movement, therefore permit them to adjust and aline themselves.

Meat tendering machines embodying stripper members having bodies which are circular or relatively circular in cross section and having upper ends which are flattened, as shown in Figs. 7 and 8, have proved very satisfactory, and superior to any other type of stripper member now known or used.

The invention provides a meat tendering machine embodying a unit which may be immediately applied to or removed from the machine merely by the loosening of a pair of end bearings. The unit comprises a framework including the spaced end plates 12 and 13 which are connected together by the tie rods 14, 15 and 16 about which the stripper members are suspended. The entire unit is supported in position and the unit is located by means of the flanges 55 which rest on the fillister-head screws 54. The unit, therefore, comprises a frame upon which the strippers are carried and upon which the knife rolls are mounted with the knives on the knife rolls arranged in the spaces between the stripper members. One stripper, the front stripper 38, is adapted to be pivotally mounted in position so that it may be swung about the upper tie rod as a pivot to permit easy cleaning. Moreover, the knife rolls may be easily removed from the unit for cleaning or repair purposes. Embossing of the end plates permits the knife rolls to be easily located in position so that when both knife rolls are in place the knives of one roll will fit in the spaces between the knives of the other roll. If desired, the upper ends of the end plates or brackets 12 and 13 may be flared outwardly as indicated at 65, Figs. 2, 3, 4 and 6, to provide handles on the unit for easily removing the unit from the machine.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. In a meat tendering machine, a unitary tendering and stripping apparatus, comprising spaced end walls, a plurality of tie-rods extending between and secured to said end walls, a first and a second knife roll removably and rotatably supported in said end walls, said knife rolls each including a plurality of spaced knives thereon and separating hubs therebetween, and a set of stripper members for each knife roll, one of said sets of stripper members including a plurality of individual fingers disposed between the knives of said first knife roll and extending above and below said knife roll, the upper end of each finger extending around a tie-rod above said knife roll and the lower end of each finger extending around a tie-rod below said knife roll, each finger having a limited free movement axially of said tie-rods, and the other of said sets of stripper members including a plurality of individual fingers disposed between the knives of said second knife roll and extending thereabove and therebelow, the upper end of each finger of said other set extending around a tie-rod above said second knife roll and having limited free movement axially thereof, the lower end of each of said last named fingers having a loop, and a rod extending loosely through said loops, said fingers engaging said hubs and said rod engaging bearing portions on said end walls of said apparatus.

2. In a meat tendering machine, a tendering and stripping apparatus comprising, a unit frame having sides thereon, a first and second knife roll removably and rotatably supported by the sides of said unit frame, said knife rolls each including a plurality of spaced knives thereon and separating hubs therebetween, and a first and second set of stripper members, one for each knife roll, the first set including a support above said first knife roll and a support below said first knife roll, both of said supports being rigidly secured to the unit frame, and a plurality of individual fingers disposed between the knives of said first knife roll and each mounted loosely at its upper and lower ends on said supports for limited free movement along the length thereof, and the second set including a plurality of individual fingers disposed between the knives of said second knife roll and mounted at their upper ends above said second knife roll for rotation about a common axis, the hubs on said second knife roll engaging said last named fingers normally to prevent rotation of the fingers, and means on the lower ends of said last named fingers engaging bearing portions on said sides.

References Cited in the file of this patent

UNITED STATES PATENTS

| | | |
|---|---|---|
| 880,589 | Snelling | Mar. 3, 1908 |
| 2,025,505 | Gonser | Dec. 24, 1935 |
| 2,163,123 | Huse | June 20, 1939 |
| 2,472,800 | Ahrndt | June 14, 1949 |
| 2,545,407 | Jackson | Mar. 13, 1951 |